US008554783B2

(12) United States Patent
Safo et al.

(10) Patent No.: US 8,554,783 B2
(45) Date of Patent: Oct. 8, 2013

(54) COMPUTER OBJECT TAGGING

(75) Inventors: Edward Safo, Oceanside, NY (US);
Alka Ladha, New York, NY (US);
Joseph Bravate, Rockville Centre, NY
(US); Dov B. Katz, Bergenfield, NJ
(US); Shafik Yaghmour, White Plains,
NY (US)

(73) Assignee: Morgan Stanley, New York, NY (US)

( * ) Notice: Subject to any disclaimer, the term of this
patent is extended or adjusted under 35
U.S.C. 154(b) by 463 days.

(21) Appl. No.: 11/856,402

(22) Filed: Sep. 17, 2007

(65) Prior Publication Data

US 2009/0077089 A1    Mar. 19, 2009

(51) Int. Cl.
*G06F 7/00* (2006.01)
*G06F 17/30* (2006.01)

(52) U.S. Cl.
USPC .......................................... 707/765; 707/767

(58) Field of Classification Search
USPC .............................. 707/2, 765, 767
See application file for complete search history.

(56) References Cited

U.S. PATENT DOCUMENTS

| | | | |
|---|---|---|---|
| 7,668,821 B1 * | 2/2010 | Donsbach et al. | 707/765 |
| 2008/0046343 A1 * | 2/2008 | Maguire et al. | 705/27 |
| 2008/0177704 A1 * | 7/2008 | Denney et al. | 707/3 |
| 2008/0275851 A1 * | 11/2008 | Taylor et al. | 707/3 |
| 2008/0281788 A1 * | 11/2008 | Frieder et al. | 707/3 |

OTHER PUBLICATIONS

"Digg/How Digg Works, Frequently Asked Questions", Aug. 7, 2007; http://digg.com/how.*
"del.icio.us social bookmarking", printed from http://del.icio.us on Aug. 7, 2007.
"What is del.icio us?", printed from http://del.icio.us/about on Aug. 7, 2007.
"What are tags?", printed from http://del.icio.us/help/taqs on Aug. 7, 2007.
"How do I get started?", printed from http://del.icio.us/help/getstarted on Aug. 7, 2007.
"Terms of Service", printed from http://del.icio.us/help/terms on Aug. 7, 2007.
"Digg / News", printed from http://digg.com on Aug. 7, 2007.
"What is Digg?", printed from http:/digg.com/about on Aug. 7, 2007.
"How Digg Works", printed from http://digg.com/how on Aug. 7, 2007.
"Frequently Asked Questions", printed from http://digg.com/faq on Aug. 7, 2007.

(Continued)

*Primary Examiner* — Apu Mofiz
*Assistant Examiner* — Chelcie Daye
(74) *Attorney, Agent, or Firm* — K&L Gates LLP

(57) ABSTRACT

Methods for classifying computer objects. The methods may comprise receiving a tag for a first computer object. The tag may comprise at least two nested categories describing the first computer object. The methods may also comprise updating a hierarchy of categories for computer objects to include the at least two nested categories describing the computer object. In addition, the methods may comprise displaying a graphical representation of the hierarchy of categories, and displaying an indication of computer objects having tags comprising a first category when an indication of the first category is received.

32 Claims, 11 Drawing Sheets

(56) References Cited

OTHER PUBLICATIONS

"Partnership Opportunities", printed from http://digg.com/partnership on Aug. 7, 2007.
"Submit a New Link", printed from http://digg.com/submit on Aug. 7, 2007.
"flickr", printed from http://flickr.com on Aug. 7, 2007.
"What is Flickr", printed from http://flickr.com/tour on Aug. 7, 2007.
"Upload", printed from http://flickr.com/tour/upload on Aug. 7, 2007.
"Organize", printed from http://flickr.com/tour/organize on Aug. 7, 2007.
"Share", printed from http://flickr.com/tour/share on Aug. 7, 2007.
"Maps", printed from http://flickr.com/tour/maps on Aug. 7, 2007.
"Make Stuff", printed from http://flickr.com/tour/makestuff on Aug. 7, 2007.
"Keep in Touch", printed from http://flickr.com/tour/keepintouch on Aug. 7, 2007.
"What is a tag?", printed from http://www.amazon.com/gp/help/customer/display.html/104-1188330-794555?ie=UTF8&nodeId-16238571&qid=1186512888&sr=1-1 on Aug. 7, 2007.
"Technorati", printed from http://technorati.com on Aug. 7, 2007.
"Where's the Fire? What's Hot, and Why", printed from http://technorati.com/wtf on Aug. 7, 2007.
"Popular", printed from http://technorati.com/pop on Aug. 7, 2007.
"My Favorites", printed from http://technorati.com/faves on Aug. 7, 2007.
"Your Watchlist", printed from http://technorati.com/watchlist on Aug. 7, 2007.
"Taglocity", printed from http://taglocity.com on Aug. 7, 2007.
"How do I use labels?", Google Gmail Help Center, printed from http://mail.google.com/support/bin/answer.py?answer=6560&topic=1549 on Aug. 7, 2007.
"How do I label my mail?", Google Gmail Help Center, printed from http://mail.google.com/support/bin/answer.py?answer=14027&topic=1549 on Aug. 7, 2007.
"How do I create a label?", Google Gmail Help Center, printed from http://mail.google.com/support/bin/answer.py?answer=14025&topic=1549 on Aug. 7, 2007.
"How do I search on a label that's more than one word?", Google Gmail Help Center, printed from http://mail.google.com/support/bin/answer.py?answer=8873&topic=1549 on Aug. 7, 2007.
"How do I remove a label from a message?", Google Gmail Help Center, printed from http://mail.google.com/suppor/bin/answer.py?answer=14028&topic=1549 on Aug. 7, 2007.
"Why doesn't my label instantly appear in my Labels box?", Google Gmail Help Center, printed from http://mail.google.com/support/bin/answer.py?answer=10296&topic=1550 on Aug. 7, 2007.
"Why does a label I deleted still show up on messages?", Google Gmail Help Center, printed from http://mail.google.com/support/bin/answer.py?answer=8839&topic=1550 on Aug. 7, 2007.
"I can't rename a label.", Google Gmail Help Center, printed from http://mail.google.com/support/bin/answer.py?answer=10295&topic=1550 on Aug. 7, 2007.
"A quick tour of Google Reader", printed from http://www.google.com/help/reader/tour.html on Aug. 7, 2007.
"Connectbeam", printed from http://connectbeam.com on Aug. 7, 2007.
"Products—Overview", printed from http://connectbeam.com/products/index.html on Aug. 7, 2007.
"Products—Features", printed from http://connectbeam.com/products/features.html on Aug. 7, 2007.
"Products—Sales Team Collaboration", printed from http://connectbeam.com/products/sales_team_collaboration.html on Aug. 7, 2007.
"Products—Research & Development", printed from http://connectbeam.com/products/research_development.html on Aug. 7, 2007.
"Products—Brand & Product Marketing", printed from http://connectbeam.com/products/brand_product_marketing.html on Aug. 7, 2007.
"Products—Proposal Development", printed from http://connectbeam.com/products/proposal_development.html on Aug. 7, 2007.
"Products—The Connected Enterprise", printed from http://connectbeam.com/products/connected_enterprise.html on Aug. 7, 2007.
"Products—Connectbeam Appliance", printed from http://connectbeam.com/products/appliance.html on Aug. 7, 2007.

* cited by examiner

COMPUTER OBJECT TAGGING

BACKGROUND

There are existing services that allow users of computer objects, such as Internet sites, photographs and e-mail, to classify or tag the computer objects. This present disclosure relates to improvements in tagging computer objects.

SUMMARY

In one general aspect, various embodiments are directed to methods for classifying computer objects. The methods may comprise receiving a tag for a first computer object. The tag may comprise at least two nested categories describing the first computer object. The methods may also comprise updating a hierarchy of categories for computer objects to include the at least two nested categories describing the computer object. In addition, the methods may comprise displaying a graphical representation of the hierarchy of categories, and displaying an indication of computer objects having tags comprising a first category when an indication of the first category is received.

In another general aspect, various embodiments are directed to a system for classifying computer objects. The system may comprise a database and a server. The database may have stored thereon a plurality of tags. Each of the plurality of tags may be associated with a corresponding computer object, and each of the plurality of tags may comprise at least two nested categories describing the corresponding computer object. The server may be configured to receive a first tag for a first computer object comprising at least one category; store the first tag at the database; and update a hierarchy of categories for computer objects to include the at least one category. The server may also be configured to display a graphical representation of the hierarchy of categories; and display an indication of computer objects having tags comprising a first category when an indication of the first category is received.

FIGURES

Embodiments of the present invention are described herein, by way of example, in conjunction with the following figures, wherein.

DESCRIPTION

Various embodiments of the present invention are directed to systems and methods of computer object tagging. The systems and methods may provide a user with the capability to assign tags to many types of computer objects including, for example, word processing documents, spreadsheets, e-mails, intranet sites, Internet sites, images, personnel data, etc. Tags assigned to different computer objects may be arranged into a tag hierarchy of nested categories, which may be defined by the users. For example, individual tags assigned to a computer object may include one or more nested categories describing the computer object. The categories making up a tag may be defined by the user assigning the tag. For example, the user may select a pre-existing tag that has already been used, or may create a new tag, for example, by creating one or more new nested categories.

Figure 1:
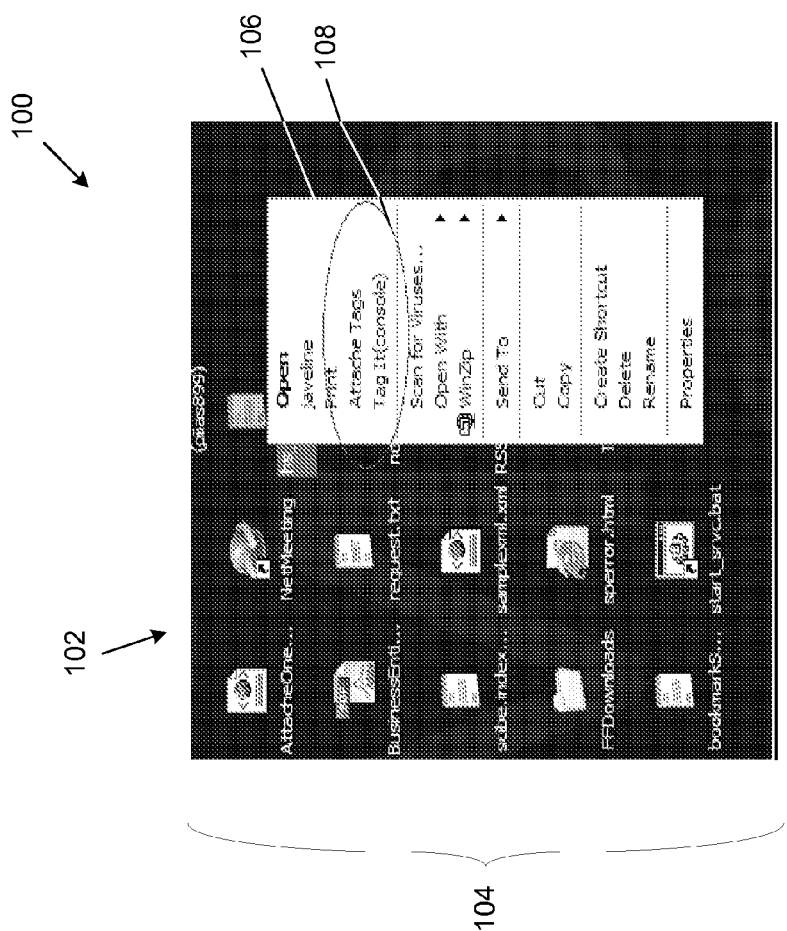
FIG. 1 illustrates a screen shot showing one embodiment of a user interface for selecting a computer object to be tagged.

The user may select a computer object to be tagged according to any suitable mechanism. For example, a tagging utility may be callable from one or more user interface menus, such as operating system menus. FIG. 1 illustrates a screen shot showing one embodiment of a user interface 100 for selecting a computer object to be tagged. According to various embodiments, the user interface 100 may be provided by an operating system. The user interface 100 includes a desktop 102 with various icons 104. Each icon 104 may represent a different computer object. When the user selects one of the icons 104, for example by right-clicking on it, the interface 100 may display a menu, such as menu 106. The user may then select from the menu 106 an indication of a tagging utility 108 from the menu 106 to tag the computer object.

Some embodiments may include other mechanisms for selecting an object to be tagged in addition to or instead of the that illustrated by the interface 100. For example, a computer object may be opened by a viewing and/or editing application (e.g., a word processor, spreadsheet application, document viewer, a web browser, etc.). The viewing and/or editing application may include a user-selectable feature for selecting open objects for tagging. Functionality for tagging may be native to the viewing and/or editing program, or the viewing and/or editing program may call a separate tagging utility. Also, a tagging utility may be executed separate from a viewing and/or editing application.

Figure 2:
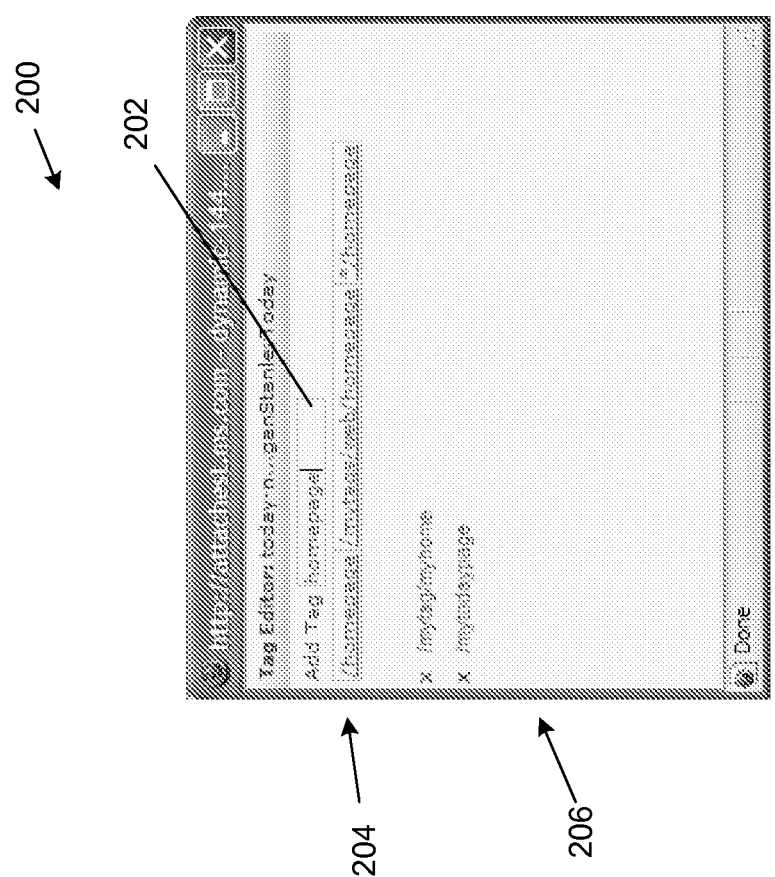
FIG. 2 illustrates one embodiment of a tagging interface.

According to various embodiments, when the user selects a computer object for tagging, the user may be provided with an interface for creating the tag. The interface may be generated by the application and/or utility facilitating the tagging process. This application and/or utility may run locally or remotely relative to the user's computer device. FIG. 2 illustrates one embodiment of a tagging interface 200. The interface 200 may include an Add Tag field 202 where the user may input one or more strings that may make up the tag. Upon receiving the string(s), the interface 200 may display a list of pre-existing tags that include the string(s), as shown at field 204. For example, the list of pre-existing tags may include tags including one or more categories the same as, or similar to the search strings. The pre-existing tags may include tags that were used by the user or by other users to tag the computer object to be tagged, or other computer objects. The interface 200 may also include an object field 206, which may indicate any tags that have already been assigned to the selected computer object.

In the example embodiment shown in FIG. 2, the string "homepage" is entered at field 202. The pre-existing tags shown at field 204 include a tag whose sole category is "homepage" as well as a tag having a general category called "mytags," and a sub-category of "mytags" called "web" with "homepage" as a sub-category of "web." The user may select one of the previously used tags or may generate a new tag by entering it at the field 204. For example, the user may generate a new tag by adding one or more new categories to an existing tage. As shown in FIG. 2, different nested categories within a tag are separated by forward slashes "/", however, any suitable nomenclature may be used.

FIGS. 3-6 illustrate another embodiment of a tagging interface, labeled 300. Generally, the interface 300 may include a Target window 310. The Target window 310 may provide an indication of the computer object to be tagged. According to various embodiments, the target window may display a location of the computer object. The computer object may be located locally at the user's computing device, or may be located remotely on an intranet, the Internet or at any other suitable location. The computer object may be accessible to the tagging user, but may or may not be accessible to other users who are able to view the resulting tag. A Description window 312 may be provided to allow the user to enter general comments about the computer object and/or view general comments entered by other users.

Figure 3:
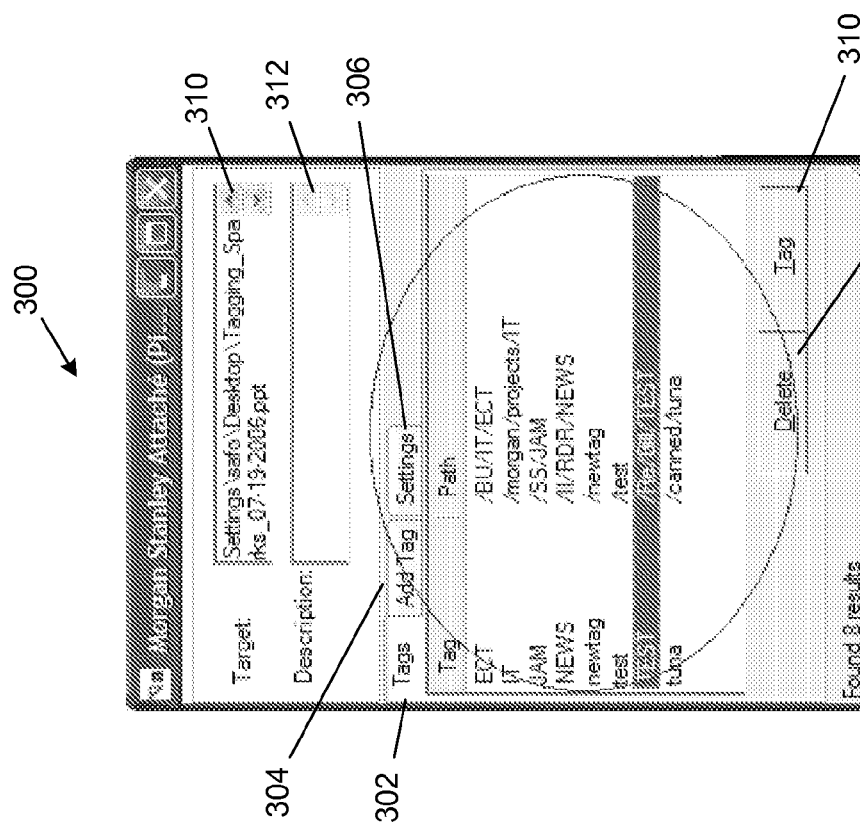
FIG. 3 illustrates another embodiment of a tagging interface with a Tags tab selected.

FIG. 3 illustrates one embodiment of the tagging interface 300 with a Tags tab 302 selected. The Tags tab 302 may illustrate the tags that have already been assigned to the computer object, for example, by the user or by other users. The user may delete a pre-assigned tag by selecting the pre-assigned tag and then selecting the Delete button 308. The user may launch the Add Tag tab 304 by selecting the Tag button 310.

Figure 4:
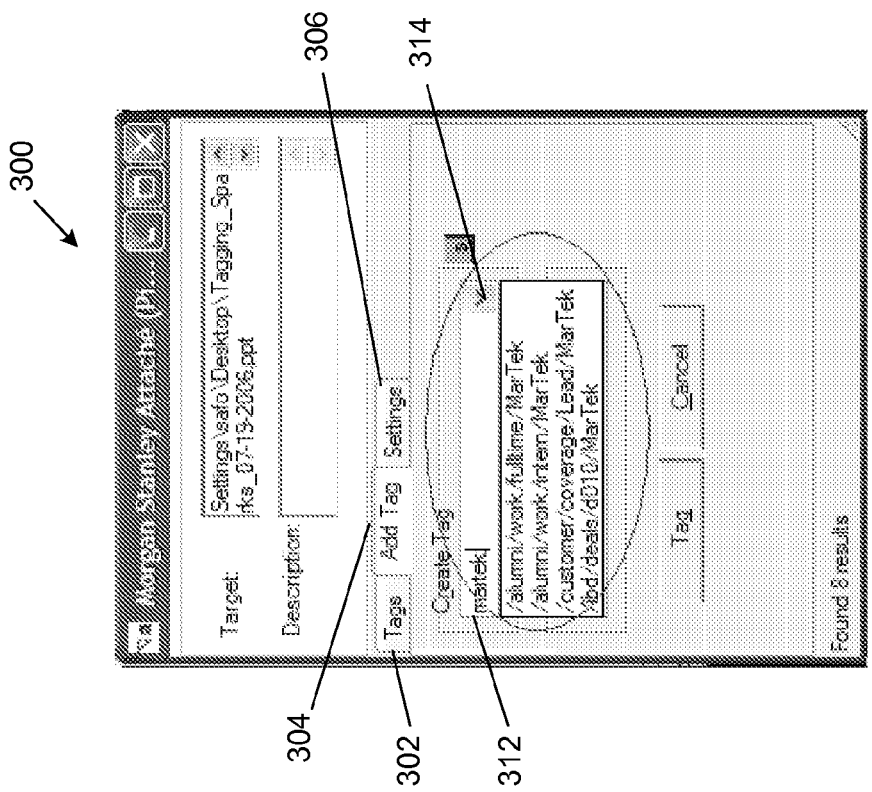
FIG. 4 illustrates one embodiment of the tagging interface of FIG. 3 with the Add Tag tab selected.
Figure 5:
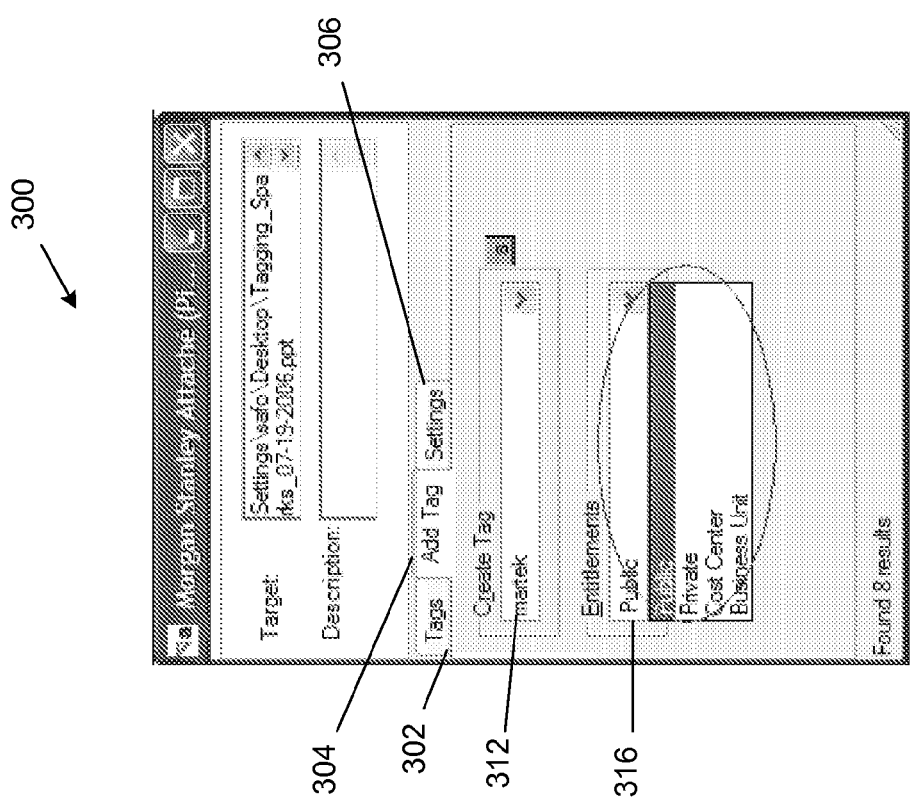
FIG. 5 illustrates the tagging interface of FIG. 3 with the Add Tag tab selected and an Entitlements field visible.

FIG. 4 illustrates one embodiment of the tagging interface 300 with the Add Tab tan 304 selected. A Create Tag window 312 may provide a field for the user to enter a text string. The user may select the drop down arrow 314 to display previously used tags. The user may select one of the previously used tags, or may create a new tag by entering it at the field 312. FIG. 5 illustrates the tagging interface 300 with the Add Tag tab 304 selected and an Entitlements field 316 visible. At the Entitlements field 316, the user may select the range of other users who will be able to access the tag being created at the interface 300. At the extremes, the tag may be public, allowing all authorized users to view it, or private allowing only the creating user to view it. Various other classes of allowed users may be selected including, for example, users that belong to a particular department, cost center or business unit; users that share common characteristics, etc.

Figure 6:
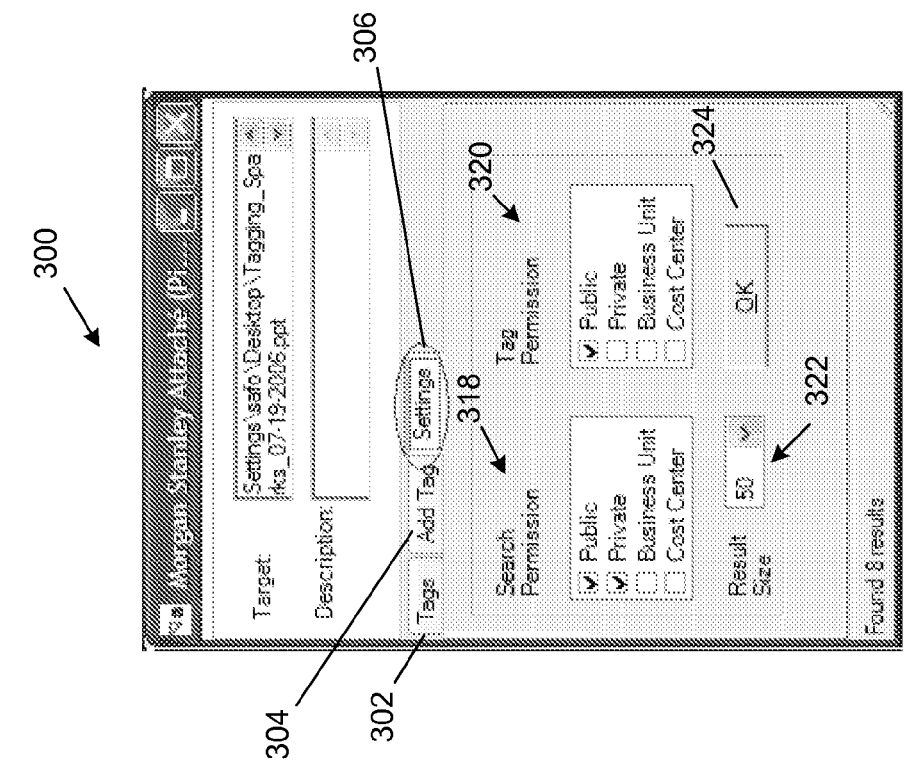
FIG. 6 illustrates the tagging interface of FIG. 3 with the Settings tab selected.

FIG. 6 illustrates the tagging interface 300 with the Settings tab 306 selected. The Settings tab 306 may allow the user to store preferred settings. For example, preferred settings may serve as default settings that the user may then modify, if desired, when tagging an computer object. As shown in FIG. 6, the tagging interface 300 includes a Search Permissions field 318 and a Tag Permission field 320. The Search Permissions field 318 may allow the user to set a preference regarding other users or classes of users who are authorized to search for the tags being created at the interface 300. The Tag Permission field 320 may allow the user to set a preference regarding the users or class of users who are authorized to modify the tag.

FIGS. 7-11 illustrate one embodiment of a search interface allowing the user to search tags assigned to computer objects. As shown in FIGS. 7-11, the interface 700 is implemented as a web application accessible via a web browser. Search interfaces, however, may be implemented and accessed in any other suitable way. For example, a search interface may be implemented as a stand alone application. Generally, the search interface 700 may include a search field 702 for receiving search strings or any other indication of a potential tag or portion of a tag. In response, the search interface 700 may return information regarding tags that meet the terms of the search string (e.g., at a tag results field 720 shown in FIGS. 9 and 10).

Figure 7:
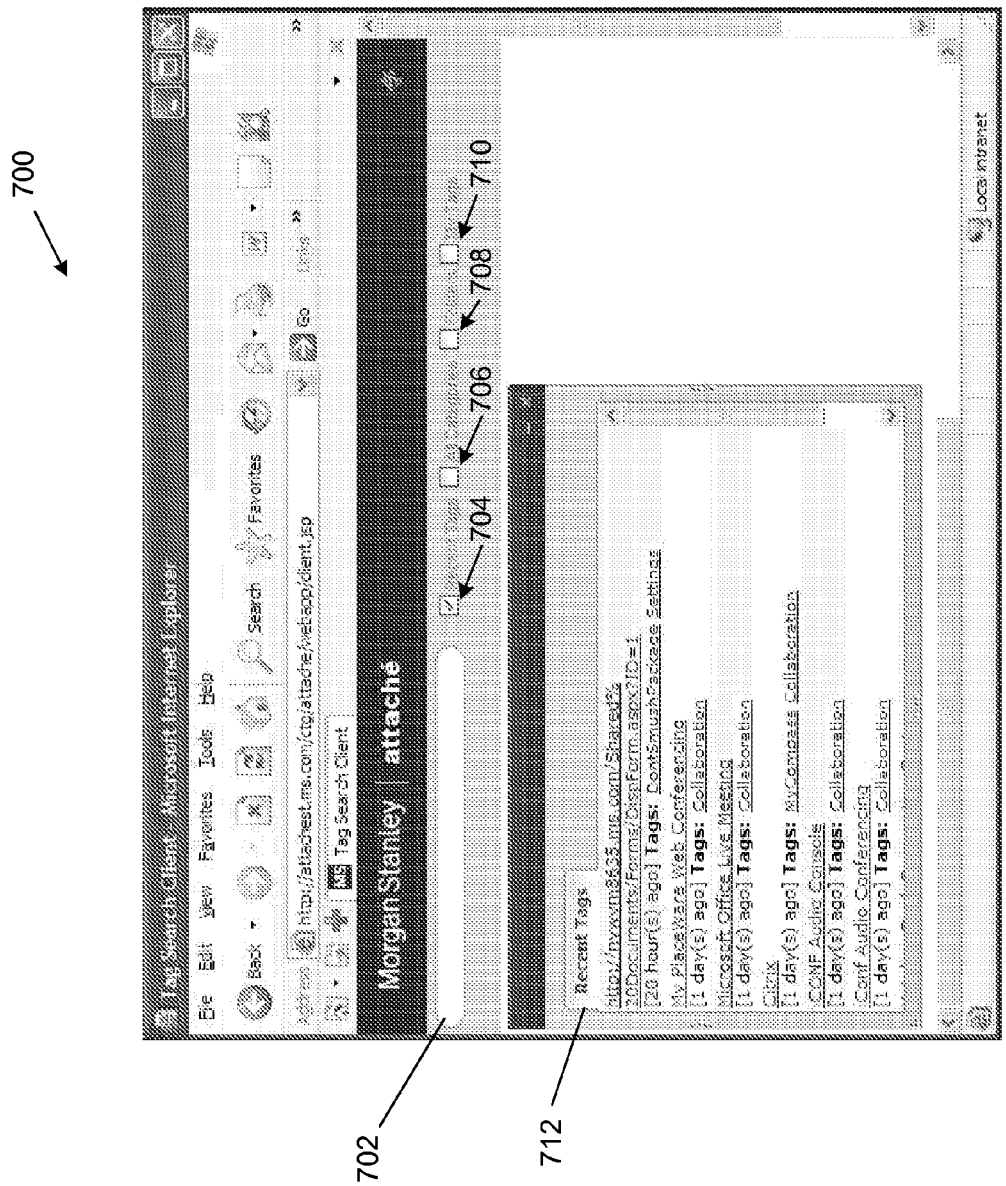
FIG. 7 illustrates one embodiment of a search interface with a Recent Tags box selected.

According to various embodiments, the search interface 700 may allow the user to search within categories of tags. For example, FIG. 7 illustrates one embodiment of the search interface 700 with a Recent Tags box 704 selected. The interface 700 may display a description of all tags that are considered recent at field 712. For example, the description may include a path to or description of the tagged computer object, a listing of the tag or tags applied to the tagged computer object and an indication of when the most recent tag was applied. According to various embodiments, a tag may be considered recent if it was applied within a predetermined amount of time. For example, tags applied in the last week may be considered recent. The predetermined amount of time may be selectable by the user. When the user enters a search string at the field 702, the field 712 may be modified to display only those recent tags matching the search string.

Figure 8:
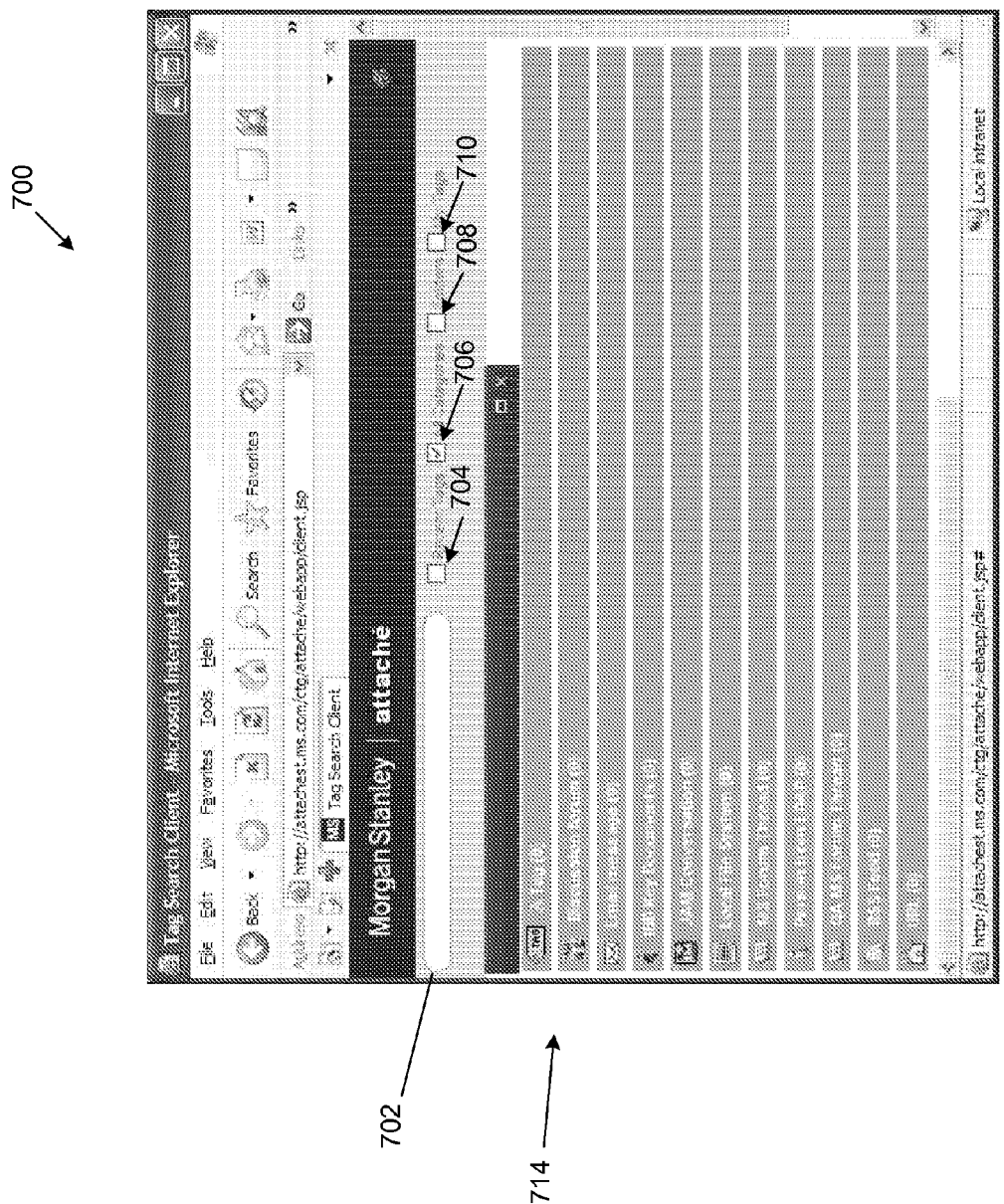
FIG. 8 illustrates one embodiment of the search interface of FIG. 7 with an All Categories box selected.

FIG. 8 illustrates one embodiment of the search interface 700 with an All Categories box 706 selected. A results field 714 may include an entry for each type of computer object that may be tagged. When the user enters a search string at the field 702, tags matching the search string may be displayed at results field 714, and may be divided by the category of their respective tagged computer objects.

FIG. 8 illustrates several example computer object types that may be tagged in various embodiments. Universal Resource Locator (URL) type computer objects may include links to Internet, intranet or other sites. Web-feed type computer objects may include data feeds to Internet, intranet or other sites (e.g., Really Simple Syndication (RSS) feeds). Forum thread type computer object may include discussion, poll or other threads from any suitable type of discussion forum. Personnel data records may include any type of data indicating or describing a person. For example, a business organization may have a personnel directory or other data structure included personnel data records. Local file type computer objects may include any computer objects on the user's local computing machine. Messaging system conversation type objects may include discussions from any suitable messaging system including, for example, AOL INSTANT MESSENGER, MICROSOFT MESSENGER, any proprietary messenger, etc. Enterprise document computer objects may include files stored at a document database (e.g., an enterprise document system. E-mail message type computer objects may include e-mails. Tag type computer objects may include tags applied to computer objects. This, for example, may allow the user to "tag" an existing tag. It will be appreciated that some computer objects may fall under more than one type, including more than one of the types described above.

Figure 9:
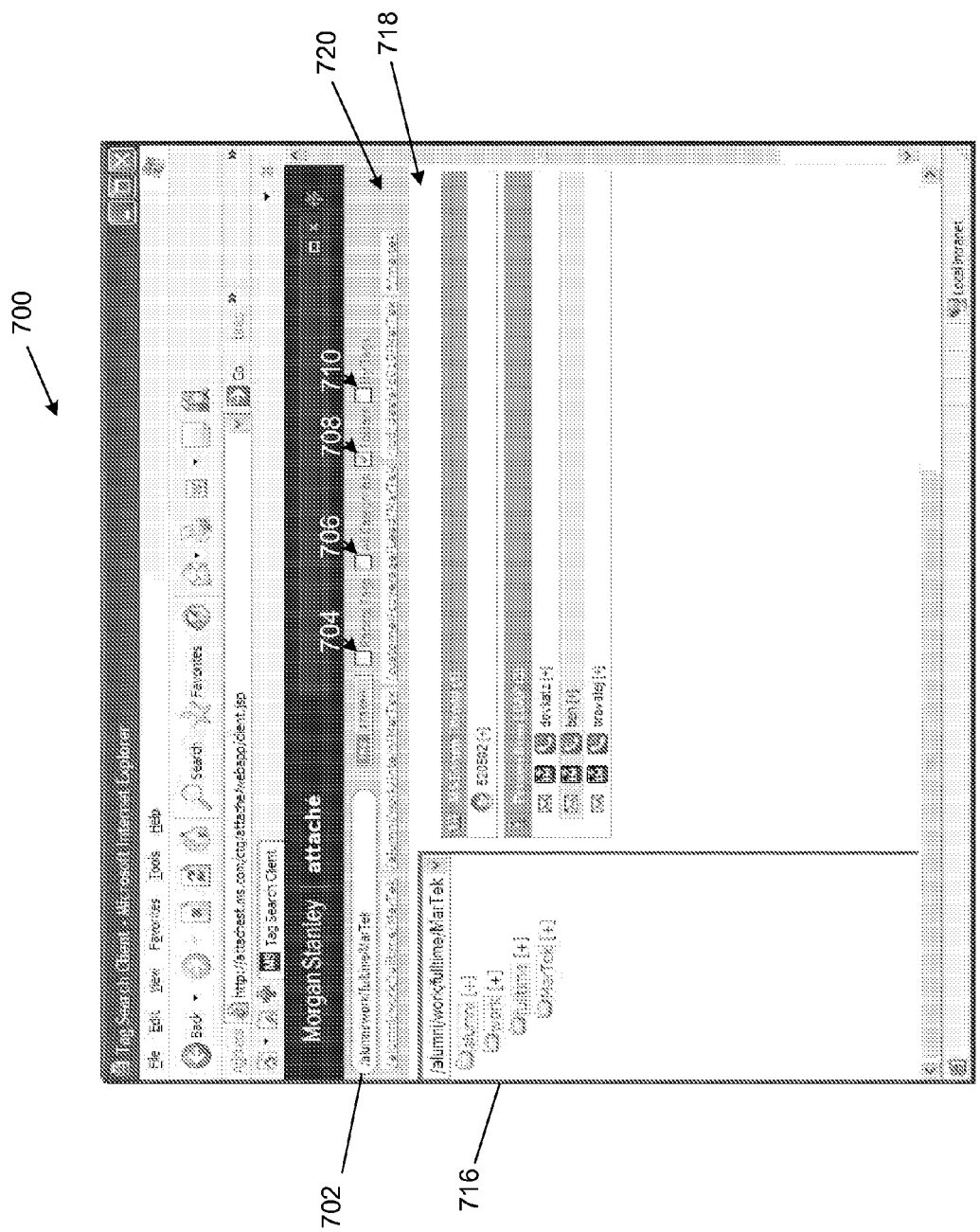
FIG. 9 illustrates one embodiment of the search interface of FIG. 7 with a Folders box selected.

FIG. 9 illustrates one embodiment of the search interface 700 with a Folders box 708 selected. When the Folders box 708 is selected, the search interface 700 may be configured to display search results in the context of the tag hierarchy. For example, a representation of the tag hierarchy, or a portion thereof, may be shown at the navigation field 716. The representation may include an indication of the various nested categories of the hierarchy. When the user selects an indication of a category, computer objects that have been tagged with a tag classified in that category may be displayed, for example, at a results field 718. In this way, the user may be able to navigate the tag hierarchy by selecting different nested categories. According to various embodiments, the indication of one or more of the nested categories shown at navigation field 716 may be expandable to show categories nested below.

In the example shown in FIG. 9, the navigation field 716 illustrates a representation of a portion of a tag hierarchy showing the example tag, "/alumni/work/fulltime/MarTek." Each component of the tag (e.g., alumni, work, fulltime, MarTek) may represent one of the nested categories. Each nested category is represented as a folder. Selecting a folder corresponding to one of the nested categories may cause the results field 718 to display all tagged objects falling within that category. For example, selecting the "work" folder under the category "alumni" may cause the results field 718 to display all tagged objects relating to people who have worked for other companies (e.g., records of personnel data, forum discussion threads, etc. As described, the user may also be able to expand one or more of the indications of the categories within the navigation field 716. For example, expanding the category "alumni" may cause the navigation field to display all of the categories nested directly below "alumni" (e.g., work, school, etc.).

According to various embodiments, the user may be able to create new nested categories, and therefore modify and/or expand the tag hierarchy. For example, in the embodiment shown in FIG. 9, the user may desire to tag an indication of an individual who was previously a full-time employee of an example company, ABC. Accordingly, the user may add a nested category under alumni/work/fulltime corresponding to company ABC. Also, as shown in FIG. 9, the interface 700 may include a tag results field 720. When the user enters a string at search field 702, the field 720 may display pre-existing tags that include or are similar to the search string.

Figure 10:
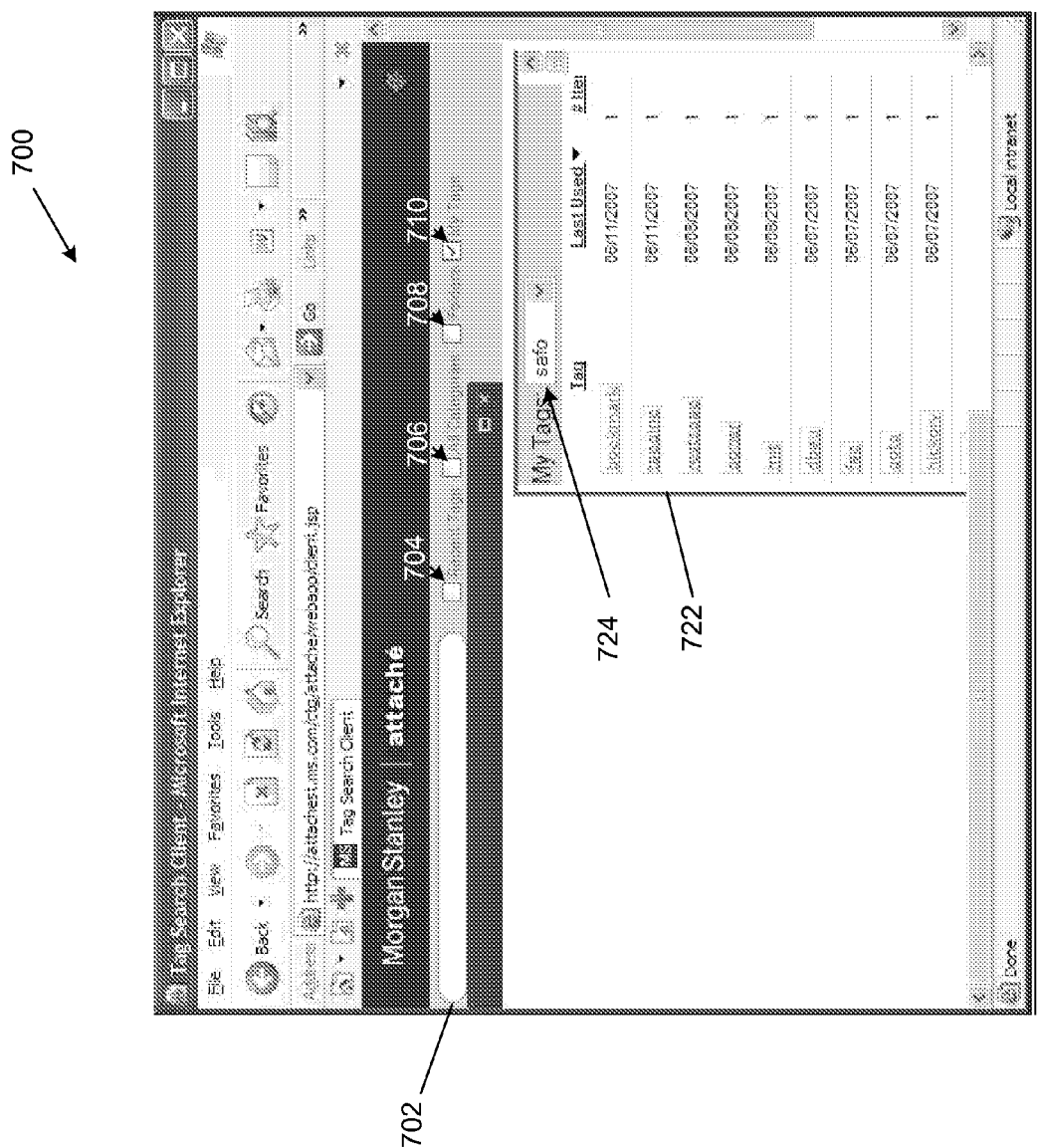
FIG. 10 illustrates one embodiment of the search interface of FIG. 7 with a My Tags box selected.
Figure 11:
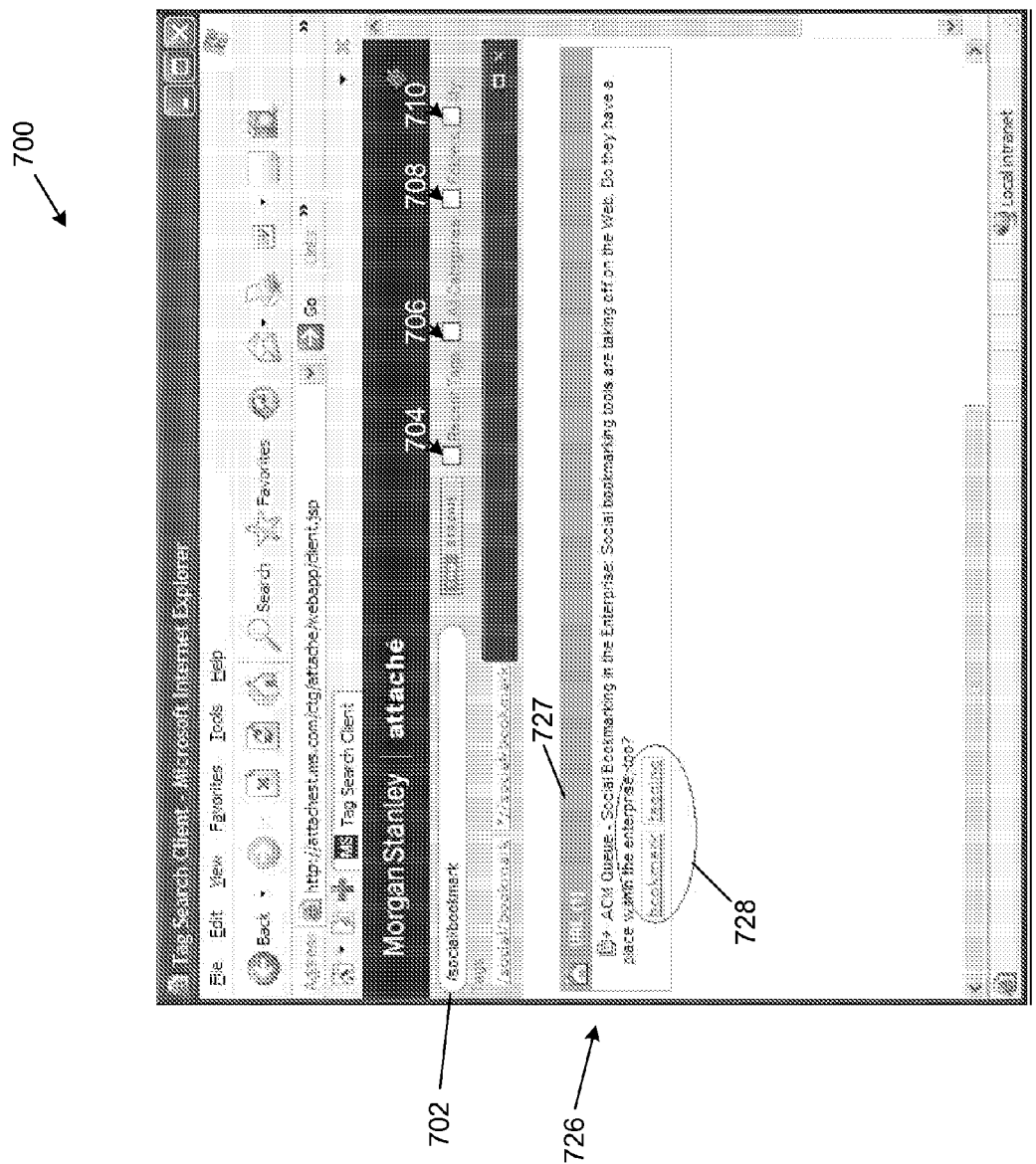
FIG. 11 illustrates one embodiment of the search interface of FIG. 7 configured to display tags associated with computer objects.

FIG. 10 illustrates one embodiment of the search interface 700 with a My Tags box 710 selected. The interface may include a results field 722 that may display various information about objects that have been recently tagged by a particular user. The user whose tags are displayed may be selected from the drop-down menu 724. FIG. 11 illustrates one embodiment of the search interface 700 configured to display tags associated with computer objects. A user may utilize the interface 700, as shown in FIG. 11, to search by computer object. A display field 726 may be configured to show indications of computer objects, such as indication 727. The indications may include a tag field 728 illustrating all of the tags that have been assigned to the computer object. In the example shown in FIG. 11, a Universal Resource Locator (URL) is shown to include two tags, "bookmark," and "tagging."

Figure 12:
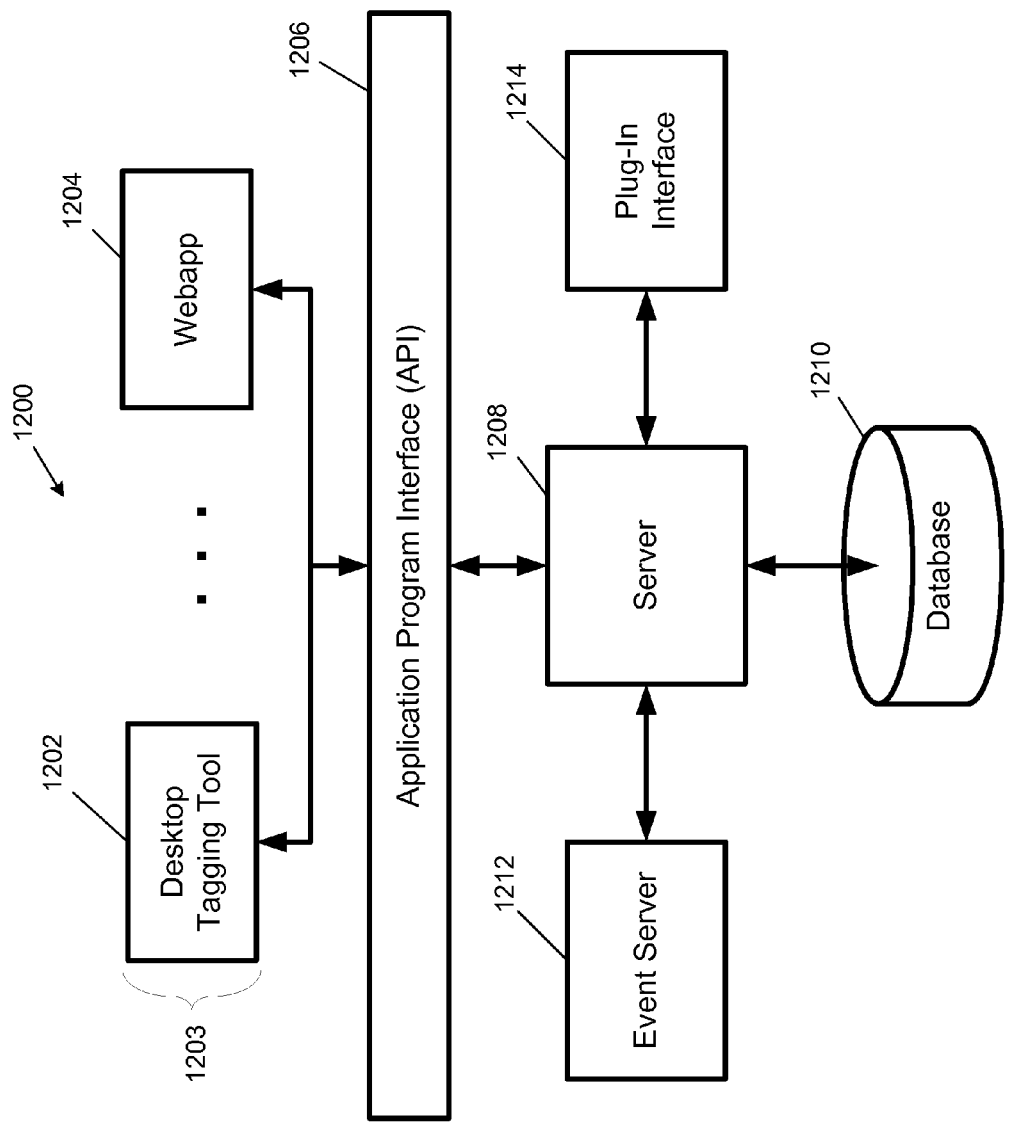
FIG. 12 illustrates one embodiment of a system for implementing computer object tagging.

FIG. 12 illustrates one embodiment of a system 1200 for implementing computer object tagging. The system 1200 may comprise a server 1208 that may administer a database 1210. Although only one server 1208 and database 1210 are shown, in various embodiments, their functionality may be spread across multiple servers 1208 or databases 1210. The database 1210 may store tag data relating to computer objects. The tag data may be stored at the database 1210 in any suitable form. For example, the database 1210 may include, for each tag, an indication of the tag and an indication of the computer object associated with the tag. The indication of the tag may be, for example, a text string which may identify each of the categories included in the tag. The indication of the computer object may be, for example, a pointer to the location of the computer object (e.g., a directory location, a URL, etc.). In various embodiments, the database 1210 may store a copy of each computer object along with the indication of the associated tag. Also, according to various embodiments, the database 1210 may be highly indexed for searching. Accordingly, the database 1210 may be able to quickly return results in response to searches. This increased searching speed may come at the expense of slower write times, however, this may be an acceptable trade-off as the system may require more searches of the database 1210 than writes to the database 1210.

The server 1208 may be configured to receive communications (e.g., search requests and write requests) in any suitable format. In various embodiments, the server 1208 may be configured to receive communications in an industry standard format such as Extensible Markup Language (XML) or a derivation thereof. The server 1208 may be in communication with an Application Program Interface (API) 1206. The API 1206 may serve as an interface between the server 1208 and various tagging applications 1203. For example, the API 1206 may be configured to receive communications from the tagging applications 1203 and place them in a format readable by the server 1208.

One or more tagging applications 1203 may be in communication with the server 1208 via the API 1206. The applications 1203 may include tagging applications, such as, for example, those demonstrated by interfaces 100, 200 and 300, and/or tag searching applications, for example, as demonstrated by the search interface 700. According to various embodiments, the applications 1203 may include desktop applications, such as desktop application 1202, and/or web applications, such as webapp 1204. The desktop application 1202 may run locally on the computing machine utilized by a user. The webapp 1204 may run remotely, for example, at the server 1208 or another server and may be accessible to the user via a network connection.

Various embodiments of the system 1200 may also include an event server 1212. The event server 1212 may be configured to provide indications of events occurring on the system 1200. For example, an administrator or other user of the system 1200 may subscribe to receive a notification from the event server 1212 upon the occurrence of selected events (e.g., any creation, deletion, or modification of a tag; a creation, deletion, or modification of a tag created by a particular user; a creation, deletion, or modification of a tag performed by a particular user, etc.). According to various embodiments, the notification may take the form of an e-mail or other alert. Also, in addition to or instead of actively sending notifications, the event server may generate a log of tagging events. Also, various embodiments of the system 1200 may include a plug-in interface 1214. The plug-in interface may allow one or more additional databases (not shown) to be added to the system. The additional databases may include tag information similar to that stored at the database 1210. Information on the additional databases may be searched, and in some embodiments modified, via the server 1208, API 1206 and applications 1203.

Figure 13:
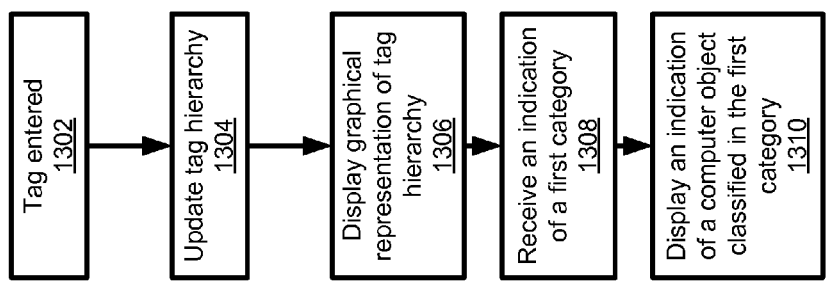
FIG. 13 illustrates one embodiment of a process flow for managing computer object tags.

FIG. 13 illustrates one embodiment of a process flow for managing computer object tags. At 1302, a tag may be entered by the user and forwarded to the server 1208, which may store the tag at the database 1210. At 1304, the tag hierarchy may be updated, for example, by the server 1208. Updating the tag hierarchy may include verifying that all of the nested categories included in the received tag are also included in the tag hierarchy. If any nested categories from the received tag are not included in the tag hierarchy, they may be added. Adding a new category to the tag hierarchy may involve modifying all parent categories of the new category to point to the new category, and configuring the new category to point to its child categories, if any. Instead of, or in addition to this, adding a new category to the tag hierarchy may involve configuring the category to point to its parent categories, and they recursively adding any child categories to point to the new category. In this way, all of the categories from the various tags may be aggregated into the tag hierarchy, for example, as a tag and/or category is used for the first time.

At 1306, a graphical representation of the tag hierarchy may be displayed to the user. For example, an application (e.g., one of applications 1203) may generate a user interface, such as search interface 700, which may display a series of folders or other nested icons with each icon corresponding to a tag category. At 1308, the system 1200 may receive an indication of a first category from the tag hierarchy. For example, the user may select a category by selecting one of the nested icons. At step 1310, an indication of at least one computer object that has been tagged in the first category may be displayed to the user, for example, as illustrated above in FIG. 9.

It is to be understood that the figures and descriptions of the present invention have been simplified to illustrate elements that are relevant for a clear understanding of the present invention, while eliminating, for purposes of clarity, other elements, such as, for example, some specific tasks of the non-execution service provider units described above, etc. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system" or "computer device" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Various aspects of the system 1200 and interfaces 100, 200, 300 and 700 may be implemented as software code to be executed by a processor(s) of any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary.

We claim:

1. A method of classifying computer objects, the method comprising:

receiving from a tagging application and storing to a tag database, by at least one computer device, tag data for a first computer object, wherein the tag data comprises (i) an indication of a tag comprising at least two nested categories describing the first computer object, (ii) an indication of the first computer object, (iii) an indication of a class of users authorized to view the tag such that users within the class are permissioned, by a first user creating a new tag, to search for the newly created tag, wherein the at least one computer device comprises at least one processor and an associated memory, and wherein the tag database is in communication with the at least one computer device;

updating, by the at least one computer device, a hierarchy of categories for computer objects to include the at least two nested categories describing the first computer object;

receiving, by the at least one computer device, an indication of a first category selected by a second user from a graphical representation of at least a portion of the hierarchy of categories displayed to the second user; and causing a display of an indication of a plurality of tagged computer objects falling within the first category to the second user, wherein for each of the plurality of tagged computer objects, the second user is associated with a class permissioned to view a tag associated with the tagged computer object;

receiving, by the at least one computer device, a subscription request associated with the second user, wherein the subscription request comprises a description of a third user, a description of at least one tag and at least one potential action to be performed on the at least one tag by the third user; and sending, by the at least one computer device, a notification to the second user upon the occurrence of the at least one potential action performed on the at least one tag by the third user.

2. The method of claim 1, wherein the updating comprises verifying that the at least two nested categories are included in the hierarchy.

3. The method of claim 1, further comprising adding a first nested category to the hierarchy of categories, wherein the first nested category is selected from the at least two nested categories.

4. The method of claim 3, wherein adding the first nested category to the hierarchy comprises at least one action selected from the group consisting of updating a parent of the first nested category to refer to the first nested category and configuring the first nested category to refer to the parent.

5. The method of claim 1, wherein the first computer object comprises an indication of a person.

6. The method of claim 1, wherein the first computer object comprises a personnel file describing a person.

7. The method of claim 1, wherein causing the display of the indication of the plurality of tagged computer objects falling within the first category comprises causing a display of only an indication of computer objects falling within the first category that the second user is entitled to access.

8. The method of claim 1, further comprising causing the display of the indication of computer objects classified in the first category only when the second user is entitled to access the first category.

9. The method of claim 1, further comprising causing the display of an indication of computer objects that have received a tag within a predetermined period of time.

10. The method of claim 1, further comprising causing the display of an indication of computer objects that have received a tag from the first user.

11. The method of claim 1, further comprising causing the display of an indication of a computer object and at least one tag that has been associated with the computer object.

12. A computer readable medium comprising
instructions thereon that when executed by at least one processor cause the at least one processor to:
receive from a tagging application and store to a tag database, tag data for a first computer object, wherein the tag data comprises (i) an indication of a tag including at least two nested categories describing the first computer object (ii) an indication of the first computer object, and (iii) an indication of a class of users authorized to view the tag such that users within the class are permissioned, by a first user creating a new tag, to search for the newly created tag, and wherein the tag database is in communication with the at least one computer device;
update a hierarchy of categories for computer objects to include the at least two nested categories describing the first computer object;
receive an indication of a first category selected by a second user from a graphical representation of at least a portion of the hierarchy of categories displayed to the second user;
cause a display of an indication of a plurality of tagged computer objects falling within the first category to the second user, wherein for each of the plurality of tagged computer objects, the second user is associated with a class permissioned to view a tag associated with the tagged computer object;
receive a subscription request associated with the second user, wherein the subscription request comprises a description of a third user, a description of at least one tag and at least one potential action to be performed on the at least one tag by the third user; and
send a notification to the second user upon the occurrence of the at least one potential action performed on the at least one tag by the third user.

13. The medium of claim 12, wherein the first computer object comprises a record comprising personnel data describing a person.

14. The medium of claim 12, further comprising instructions that when executed by the at least one processor cause the at least one processor to display only an indication of computer objects classified in the first category that the second user of the system is entitled to access.

15. The medium of claim 12, further comprising instructions that when executed by the at least one processor cause the at least one processor to display the indication of computer objects classified in the first category only when the second user of the system is entitled to access the first category.

16. The medium of claim 12, further comprising instructions that when executed by the at least one processor cause the at least one processor to display an indication of computer objects that have received a tag within a predetermined period of time.

17. The medium of claim 12, further comprising instructions that when executed by the at least one processor cause the at least one processor to display an indication of computer objects that have received a tag from the first user.

18. The medium of claim 12, further comprising instructions that when executed by the at least one processor cause the at least one processor to display an indication of a computer object and at least one tag that has been associated with the computer object.

19. The medium of claim 12, wherein each of the plurality of tags comprises a link identifying an associated computer object.

20. A system for classifying computer objects, the system comprising:
a server in electronic communication with a computer readable medium, the server configured to:
receive from a tagging application and store to a tag database, tag data for a first computer object, wherein the tag data comprises (i) an indication of a tag including at least two nested categories describing the first computer object (ii) an indication of the first computer object, and (iii) an indication of a class of users authorized to view the tag such that users within the class are permissioned, by a first user creating a new tag, to search for the newly created tag, and wherein the tag database is in communication with the at least one computer device;
update a hierarchy of categories for computer objects to include the at least two nested categories describing the first computer object;
receive an indication of a first category selected by a second user from a graphical representation of at least a portion of the hierarchy of categories displayed to the second user; and
causing a display of an indication of a plurality of tagged computer objects falling within the first category to the second user, wherein for each of the plurality of tagged computer objects, the second user is associated with a class permissioned to view a tag associated with the tagged computer object;
receive a subscription request associated with the second user, wherein the subscription request comprises a description of a third user, a description of at least one tag and at least one potential action to be performed on the at least one tag by the third user; and
send a notification to the second user upon the occurrence of the at least one potential action performed on the at least one tag by the third user.

21. The system of claim 20, further comprising an event server configured to generate a record of tagging events.

22. The system of claim 20, further comprising a plug-in interface executed by the server, wherein the sever is configured to communicate, via the plug-in interface, with a first database comprising a first plurality of tags and a second database comprising a second plurality of tags.

23. The system of claim 20, further comprising an Application Program Interface (API) executed by the server, wherein executing the API causes the server to:
receive a request from an application; and
modify the request.

24. The method of claim 1, further comprising generating, by an event server, a record of tagging events including the receipt of the tag.

25. The method of claim 1, further comprising receiving tag information from the tag database; and receiving tag information from a second database via a plug-in interface.

26. The method of claim 1, further comprising executing, by the server, an Application Program Interface (API), wherein executing the API causes the server to:
receive a request from an application; and
modify the request.

27. The method of claim 1, wherein the tag data further comprises an indication of a second class of users authorized to modify the tag such that users within the second class are permissioned, by the user creating the new tag, to modify the newly created tag.

28. The method of claim 1, further comprising storing a copy of the first computer object to the tag database.

29. The system of claim 20, wherein the tag data further comprises an indication of a second class of users authorized to modify the tag such that users within the second class are permissioned, by the first user creating the new tag, to modify the newly created tag.

30. The system of claim 20, wherein the server is also configured to store a copy of the first computer object to the tag database.

31. The computer readable medium of claim 12, wherein the tag data further comprises an indication of a second class of users authorized to modify the tag such that users within the second class are permissioned, by the first user creating the new tag, to modify the newly created tag.

32. The computer-readable medium of claim 12, further comprising instructions that when executed by the at least one processor cause the at least one processor to store a copy of the first computer object to the tag database.

* * * * *